May 21, 1935.  G. W. NEWMAN  2,002,155
POST BINDER
Filed March 30, 1934   2 Sheets-Sheet 1
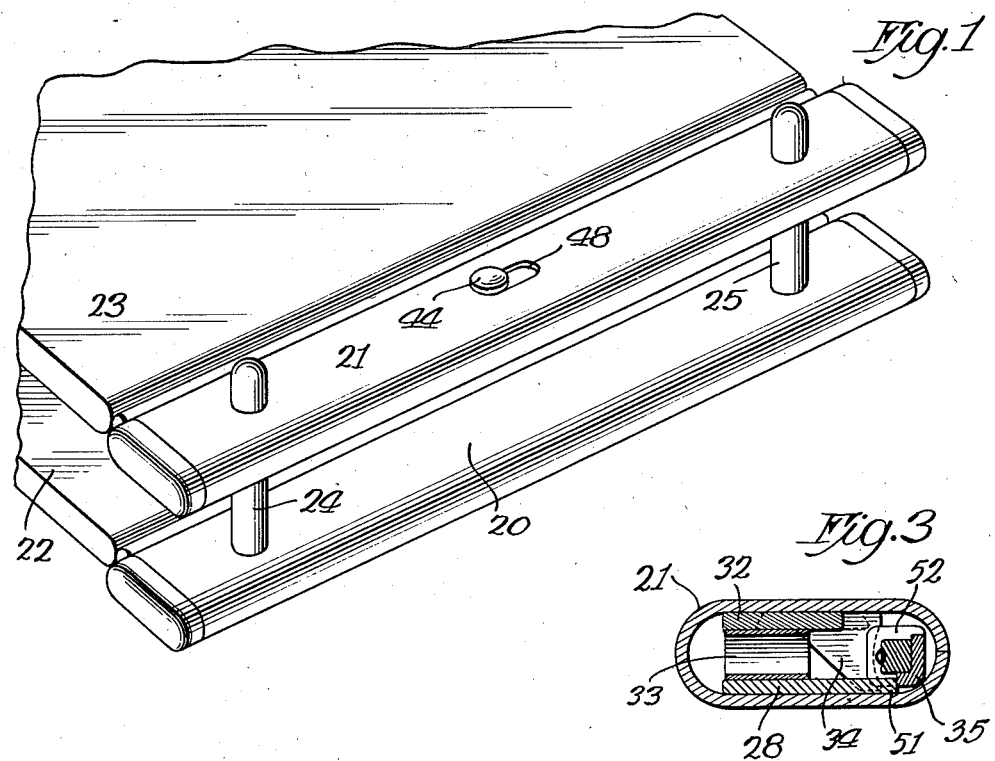
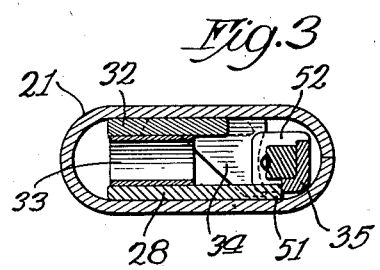
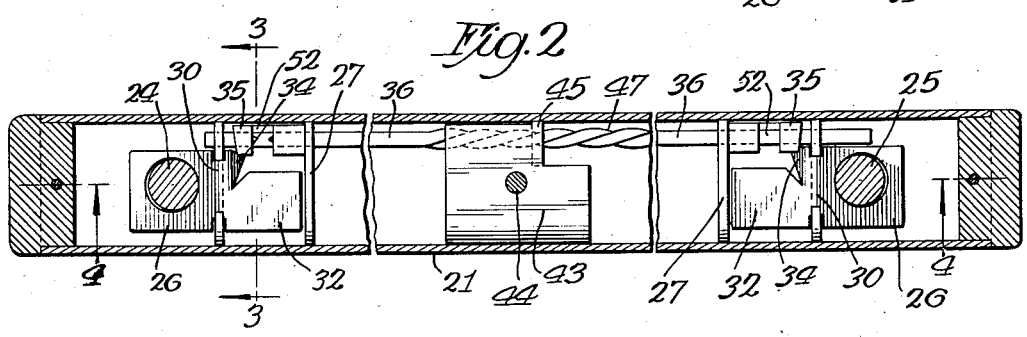
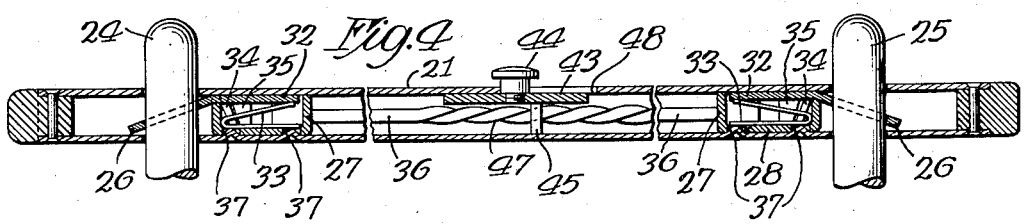
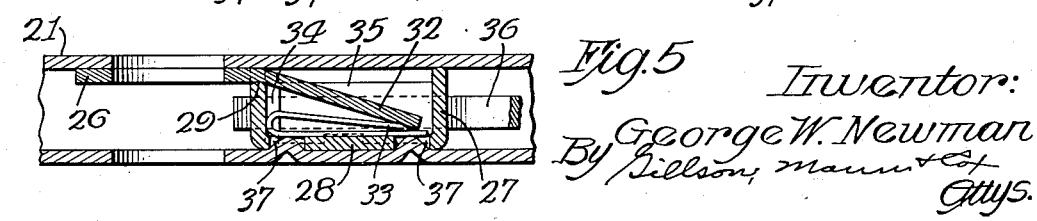
Inventor:
George W. Newman
By Gillson, Maun & Co
Attys.

May 21, 1935.   G. W. NEWMAN   2,002,155
POST BINDER
Filed March 30, 1934   2 Sheets-Sheet 2
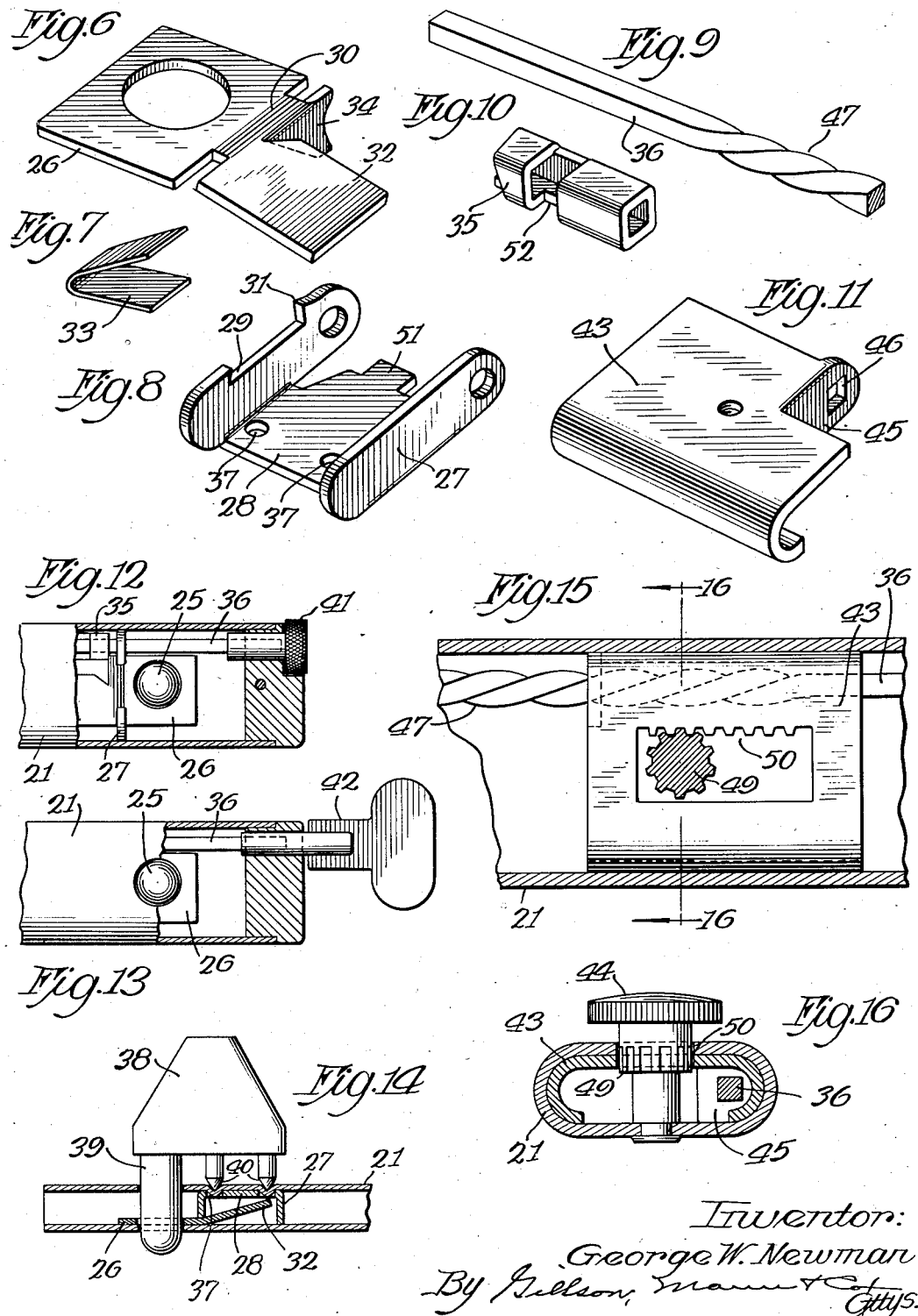
Inventor:
George W. Newman Patented May 21, 1935

2,002,155

UNITED STATES PATENT OFFICE 2,002,155

POST BINDER

George W. Newman, St. Louis, Mo., assignor to Loose Leaf Metals Company, a corporation of Missouri Application March 30, 1934, Serial No. 718,112

5 Claims. (Cl. 129—12)

The invention relates particularly to the locking mechanism for post binders.

Among the objects of the invention are the economizing of space; simplicity and certainty of control; and economy of manufacture.

The invention is fully hereinafter described and is illustrated in the accompanying drawings, in which:

Fig. 1 is a detail perspective view of a post binder;

Fig. 2 is a plan section of the upper binder bar equipped with the improved locking mechanism;

Fig. 3 is a sectional view on the line 3—3 of Fig. 2;

Fig. 4 is a sectional view on the line 4—4 of Fig. 2;

Fig. 5 is a sectional detail of the binder bar and of the locking mechanism;

Figs. 6 to 11 inclusive are views in perspective of the various elements of the locking mechanism;

Figs. 12 and 13 are details, partly in plan section, showing two forms of locking control mechanism;

Fig. 14 is a longitudinal sectional detail of the binder bar, showing in elevation the means for securing the cage of the locking mechanism in position in the bar;

Fig. 15 is a detail plan section of the binder bar showing one means for actuating the lock-controlling rod; and Fig. 16 is a sectional view on the line 16—16 of Fig. 15.

The invention appertains to loose leaf binders of the post type, as shown in Fig. 1, wherein the lower binder bar is designated 20 and the upper bar 21, the binder covers 22, 23, being hinged, respectively, to these two bars. The posts for holding the sheets are shown at 24, 25, and being, as usual, fixed in the lower bar 20 and projecting loosely through apertures in the upper bar, within which the locking mechanism for securing this bar to the posts is housed.

The locking mechanism associated with each post, shown in assembled form in Figs. 2, 4 and 5, comprises a dog in the form of an apertured plate 26, pivotally secured within the chamber of the bar 21 and encircling the post 24 or 25. This dog is carried by a cage 27, anchored within the bar and comprising a pair of parallel bars which extend across and fit snugly within the bar chamber, and are connected together by a bed plate 28. One of the bars of the cage is notched in its upper margin, as shown at 29, to loosely receive the neck portion 30 of the dog, the ends of this notch, as shown at 31, being adapted to be bent down over the neck of the dog by a blow with a suitable tool to hold the parts in assembly yet permit free rocking movement of the dog.

An integral tail plate, 32, of the dog projects into the cage, and a spring 33, of any suitable form, reacts between this plate and the bottom plate 28 of the cage to normally hold the dog in locking engagement with the post, as shown in Fig. 4. A cam flange 34 projects from the neck 30 for engagement by a cam block 35, carried by a rotatable actuating rod 36, which is journaled in the cross bars of the cage and extends along the side of the chamber of the bar.

The bed plate 28 of the cage is apertured, as shown at 37, 37, and the cage is anchored in the bar chamber by striking up a portion of a wall of the latter into these apertures, as shown in Fig. 14. This operation is performed by means of a punch 38, having a pilot bar 39, which enters the post aperture in the bar and properly positions the indenting noses 40. This locking mechanism is in duplicate, one set being associated with each of the posts 24, 25, and both sets being controlled by the rod 36.

This actuating rod may, if desired, extend to the end of the bar, as shown in Figs. 12 and 13, and may be provided with a permanently attached knurled finger piece 41, by means of which it may be turned; or it may be turned by a detached key 42. I prefer, however, to control the rod by a sliding element 43 in the form of a plate slidingly located within the bar chamber between the two locking mechanisms, and controlled by a finger piece, as 44, projecting through a suitable aperture in the upper wall of the bar.

The plate 43 carries a vertical lug 45, having a squared aperture 46, through which the rod 36 extends. The middle portion of the rod is twisted to form screw-threads, as shown at 47, which are engaged by the angles of the aperture 46. Longitudinal movement of the element 43 in the tube causes the turning of the rod to control the locking dogs.

The finger-piece 44 may either slide within a longitudinal aperture, as 48, in the bar, carrying with it the element 43, or it may be rotatable and carry on its stem gear teeth 49, which engage the teeth of a rack bar 50, formed in a longitudinal aperture in the element 43.

The cam blocks 35 are sleeved upon the rod 36. The one associated with the lock mechanism remote from the end of the bar 21 at which the rod is entered may be fixed to the rod, and in that case prevents longitudinal movement of the rod. The other block is preferably not attached to the rod, for convenience in assembling the parts. The bed plate 28 of the cage is provided with a tongue 51, which fits within a channel 52 in the block 35 and holds the block against longitudinal movement while permitting it to turn.

The construction shown and described is thoroughly practical and satisfactory, but other forms within the scope of the invention may be followed.

I claim as my invention—

1. A binder lock comprising a cage adapted to fit within the chamber of a binder bar, a locking plate pivoted on the cage and having an aperture for loosely encircling a binder post and having a tail piece and a cam-engaging wing projecting into the cage, a spring acting on the tail piece for normally tilting the plate to gripping position relative to the post, and a manually controlled rotatable cam for engaging the wing to move the plate in opposition to the spring.

2. A binder comprising a bar having sheet-holding posts rising therefrom, a chambered bar apertured to slide upon the posts, locking means within the chamber for engaging the posts, a rotatable rod within the chamber of the bar for controlling the locking means and having a threaded section, a slidable nut engageable with such threaded section, and a stem projecting through a wall of the binder bar for shifting the nut to turn the rod.

3. A binder comprising a bar having sheet-holding posts rising therefrom, a chambered bar apertured to slide upon the posts, locking means within the chamber for engaging the posts, a rotatable rod within the chamber of the bar for controlling the locking means and having a threaded section, a slidable nut engageable with such threaded section and having a gear rack on its body, and a manually controlled pinion engageable with the rack.

4. In a post binder, in combination, a chambered binder bar transversely apertured to slide on a pair of binder posts, locking mechanism within the bar for engaging the posts and comprising a pair of pivoted post gripping dogs, and a cage carrying each dog consisting of a pair of parallel bars extending transversely across the chamber of the binder bar and a plate uniting such bars and having a pair of apertures receiving anchoring bosses punched down from the transverse wall of the binder bar, and a manually operated rod carried by the cage bars for controlling the dogs.

5. A binder, having a bar having sheet-holding posts arising therefrom, a chambered bar apertured to slide upon the posts, locking means within the chamber for engaging the posts, a rotatable rod journalled in the chamber, and having a threaded section, means carried by the rod for controlling the locking means, a slidable nut engaging the threaded section, and manually actuated means for moving the nut.

GEORGE W. NEWMAN